US008582456B2

(12) United States Patent
Singh et al.

(10) Patent No.: US 8,582,456 B2
(45) Date of Patent: Nov. 12, 2013

(54) METHOD AND SYSTEM FOR DIGITAL CONTENT PROTECTION LOCALITY CHECK WITH ADAPTIVE TIMELINE IN WIRELESS COMMUNICATION SYSTEMS

(75) Inventors: Harkirat Singh, Santa Clara, CA (US);
Ju-Lan Hsu, Saratoga, CA (US); Su Khiong Yong, Santa Clara, CA (US);
Ilju Na, Suwon (KR); Chiu Ngo, San Francisco, CA (US)

(73) Assignee: Samsung Electronics Co., Ltd, Suwon (KR)

( * ) Notice: Subject to any disclaimer, the term of this patent is extended or adjusted under 35 U.S.C. 154(b) by 345 days.

(21) Appl. No.: 12/821,048

(22) Filed: Jun. 22, 2010

(65) Prior Publication Data
US 2011/0096681 A1    Apr. 28, 2011

Related U.S. Application Data

(60) Provisional application No. 61/255,417, filed on Oct. 27, 2009.

(51) Int. Cl.
*H04W 4/02* (2009.01)
*H04J 1/16* (2006.01)
*H04J 3/14* (2006.01)

(52) U.S. Cl.
USPC .......................................... 370/252

(58) Field of Classification Search
USPC .................. 370/252, 338; 725/16; 726/26–30
See application file for complete search history.

(56) References Cited

U.S. PATENT DOCUMENTS

| 6,324,288 | B1 | 11/2001 | Hoffman |
| 7,428,216 | B2 * | 9/2008 | Siddiqui et al. ............ 370/230.1 |
| 7,688,819 | B2 * | 3/2010 | Ramaiah et al. ............ 370/389 |
| 8,005,055 | B2 * | 8/2011 | Kwak et al. ................. 370/338 |
| 8,023,976 | B2 * | 9/2011 | Shao et al. .................. 455/502 |
| 8,040,909 | B2 * | 10/2011 | Yi et al. ...................... 370/419 |
| 8,155,321 | B2 * | 4/2012 | Devanand et al. ........... 380/281 |
| 2006/0268886 | A1 * | 11/2006 | Sammour et al. ............ 370/394 |
| 2007/0058559 | A1 | 3/2007 | Xu |
| 2007/0147245 | A1 * | 6/2007 | Foore et al. .................. 370/231 |
| 2007/0258419 | A1 * | 11/2007 | Zhao et al. ................... 370/338 |
| 2008/0056297 | A1 * | 3/2008 | Gaur et al. ................... 370/447 |
| 2012/0127937 | A1 | 5/2012 | Singh et al. |

OTHER PUBLICATIONS

RFC 793: Transmission Control Protocol, Sep. 1981, DARPA.*

(Continued)

*Primary Examiner* — Abdullah Riyami
*Assistant Examiner* — Brian Cox
(74) *Attorney, Agent, or Firm* — Kenneth L. Sherman, Esq.; Michael Zarrabian, Esq.; Sherman & Zarrabian LLP

(57) ABSTRACT

A method and system for data communication in a wireless network is provided. A wireless transmitter transmits a locality check message from a wireless transmitter to a wireless receiver over a wireless communication medium. Upon receiving a locality check response message from the wireless receiver, the wireless transmitter marks the locality check response message as valid even if it arrives after an original locality check time period since transmission of the locality check message, but before the end of an adjusted locality check time period. The adjusted locality check time period comprises said original locality check time period adjusted by delays in processing layers at the transmitter and wireless communication medium access delays in data communication between the wireless transmitter and the wireless receiver.

46 Claims, 7 Drawing Sheets

(56) References Cited

OTHER PUBLICATIONS

Intel Corporation, "High-bandwidth Digital Content Protection (HDCP) Interface Independent Adaptation Specification Revision 2.0, Chapter 2.3: Locality Check", Digital Content Protection LLC, Oct. 23, 2008, pp. 16-17, United States, http://www.digital-cp.com/files/static_page_files/2C1C0F30-0E09-E813-BFAB6BAAE8A76080/HDCP%20Interface%20Independent%20Adaptation%20Specification%20Rev2_0.pdf.

IEEE Computer Society, "IEEE Std 802.11™—2007 (Revision of IEEE Std 802.11-1999 ), IEEE Standard for Information technology—Telecommunications and information exchange between systems—Local and metropolitan area networks—Specific requirements, Part 11: Wireless LAN Medium Access Control (MAC) and Physical Layer (PHY) Specifications", IEEE, Jun. 12, 2007, pp. i-1184, New York, United States.

International Search Report and Written Opinion dated Jul. 9, 2012 for International Application No. PCT/KR2011/008861 from Korean Intellectual Property Office, filed Nov. 21, 2011, pp. 1-9, Seo-gu, Daejeon, Republic of Korea.

Newhouse, T. et al., "Resource-Controlled Remote Execution to Enhance Wireless Network Applications," Proceedings of 4th Workshop on Applications and Services in Wireless Networks (ASWN '04), 2004, pp. 30-38, IEEE, United States.

Xia, P. et al., "Short Range Gigabit Wireless Communications Systems: Potentials, Challenges, and Techniques," Proceedings of IEEE International Conference on Ultra-Wideband (ICUWB '07), 2007, pp. 123-128, IEEE, United States.

* cited by examiner

METHOD AND SYSTEM FOR DIGITAL CONTENT PROTECTION LOCALITY CHECK WITH ADAPTIVE TIMELINE IN WIRELESS COMMUNICATION SYSTEMS

RELATED APPLICATION

This application claims priority from U.S. Provisional Patent Application Ser. No. 61/255,417 filed on Oct. 27, 2009, incorporated herein by reference.

FIELD OF THE INVENTION

The present invention relates in general to wireless communication, and in particular, to digital content copy protection in wireless communication.

BACKGROUND OF THE INVENTION

High-bandwidth Digital Content Protection (HDCP) developed by Intel Corporation provides a digital copy protection approach for digital audio and video content (A/V content) transmitted across cables (e.g., DVI, HDMI) in wired digital systems. HDCP attempts to prevent copy of such A/V content.

An HDCP wireless transmitter device enforces locality on the A/V content by requiring that the Round Trip Time (RTT) between a pair of messages to be no more than 7 milliseconds (ms). This is an attempt to prevent distribution of A/V content beyond a local area network such as a home network.

For locality check between an HDCP transmitter and HDCP receiver, the HDCP transmitter, after initiating the locality check, sets a watchdog timer and waits for 7 ms before which it expects to receive a response from the HDCP receiver. The locality check is performed to ensure that content protection keys can only be exchanged if the RTT is less than 7 ms for point-to-point communication.

However, meeting such RTT may be difficult and unpredictable in a random access wireless network such as a wireless local area network (WLAN) based on the IEEE 802.11 standards (e.g., a Wi-Fi network). For wireless networks where multiple users are accessing the same wireless communication medium, random access delay may be introduced into the RTT. As a result, a locality check using RTT as in HDCP may fail because of random access delays, resulting in long delays for stream set up.

BRIEF SUMMARY OF THE INVENTION

Embodiments of the invention provide a method and system for data communication in a wireless network, wherein a wireless transmitter transmits a locality check message from a wireless transmitter to a wireless receiver over a wireless communication medium. Upon receiving a locality check response message from the wireless receiver, the wireless transmitter marks the locality check response message as valid even if it arrives after an original locality check time period, but before the end of an adjusted locality check time period. The adjusted locality check time period comprises said original locality check time period adjusted by delays in processing layers and wireless communication medium access delays in data communication between the wireless transmitter and the wireless receiver.

These and other features, aspects and advantages of the present invention will become understood with reference to the following description, appended claims and accompanying figures.

DESCRIPTION OF THE INVENTION

The present invention provides digital content protection locality check with adaptive timeline. One embodiment provides a method and system for processing of locality check, data driven by a locality check timeline in a network of electronic devices including wireless communication devices. The invention provides dynamic allowance to a locality check timeline to offset processing and wireless channel access delays.

According to an embodiment of the invention, after transmission of a locality check message from a wireless transmitter over a wireless communication medium, a locality check response message from a wireless receiver is marked as valid even if it arrives after the original locality check time-line, but before the end of an adjusted locality check time-line. This allows a locality check timeline to offset delays in processing layers, and wireless communication medium access delays (e.g., FIG. 2, Transmission Control Protocol/Internet Protocol (TCP/IP) and Media Access Control (MAC) layer channel access delays). Such a wireless medium may comprise a radio frequency (RF) wireless communication channel.

An implementation of an embodiment of the invention for an example wireless communication system such as a wireless network is now described. In a wireless network including multiple wireless devices (e.g., wireless transmitter and/or receiver devices such as wireless stations), a frame structure is used for data transmission between wireless stations such as a transmitter and a receiver. For example, using the IEEE 802.11 standard a wireless local area network (WLAN), a superframe structure (marked by beacon frames) is used in a Media Access Control (MAC) layer and a physical (PHY) layer. In a wireless transmitter, a MAC layer receives a MAC Service Data Unit (MSDU) and attaches a MAC header thereto, in order to construct a MAC Protocol Data Unit (MPDU).

Figure 1:
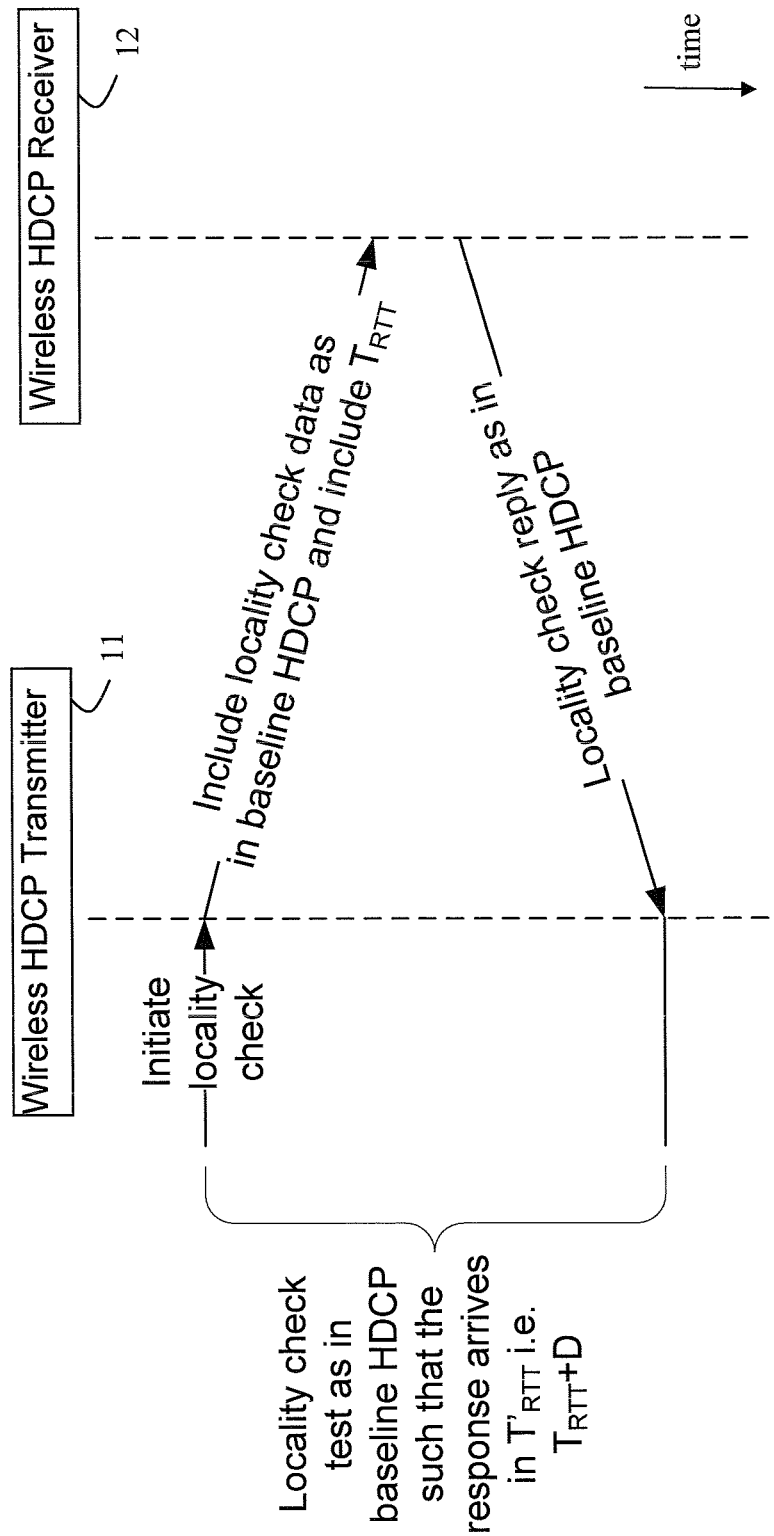
FIG. 1 shows a process for digital audio and video (A/V) content protection locality check with adaptive timeline in a wireless network, according to an embodiment of the invention.

FIG. 1 shows a process for digital A/V Content Protection locality check with adaptive timeline in a WLAN 10 comprising multiple electronic wireless communication stations communicating over a wireless channel, according to an embodiment of the invention. Specifically, the WLAN 10 comprises a wireless HDCP transmitter 11 and a wireless HDCP receiver 12, implementing digital A/V Content Protection locality check with adaptive timeline (i.e., modified locality check), according to an embodiment of the invention. Hereinafter, the terms "transmitter", "HDCP transmitter" and "wireless transmitter", refer to said wireless HDCP transmitter 11 according to an embodiment of the invention. Further, the terms "receiver", "HDCP receiver" and "wireless receiver", refer to said wireless HDCP receiver 12, according to an embodiment the invention.

A modified locality check (i.e., modified HDCP) according to an embodiment of the invention is implemented, wherein the wireless transmitter 11 maintains an absolute value of an original locality check time-line ($T_{RTT}$). As shown in FIG. 1, $T_{RTT}$ is included in the baseline locality check data transmitted by the HDCP transmitter 11. Each processing layer independently keeps track of a processing delay ($D_P$) and a random channel access delay ($D_C$) that is mainly incurred at the MAC layer of the transmitter 11. In a locality check two-way exchange process according to an embodiment of the invention, the $T_{RTT}$ is dynamically (adaptively) adjusted by an overall measured delay D (i.e., $D=D_P+D_C$) to provide an adjusted locality check time-line $T'_{RTT}$, wherein $T'_{RTT}=T_{RTT}+D$, described in further detail below in an example implementation.

Dynamic Allowance of the Locality Check

Figure 2:
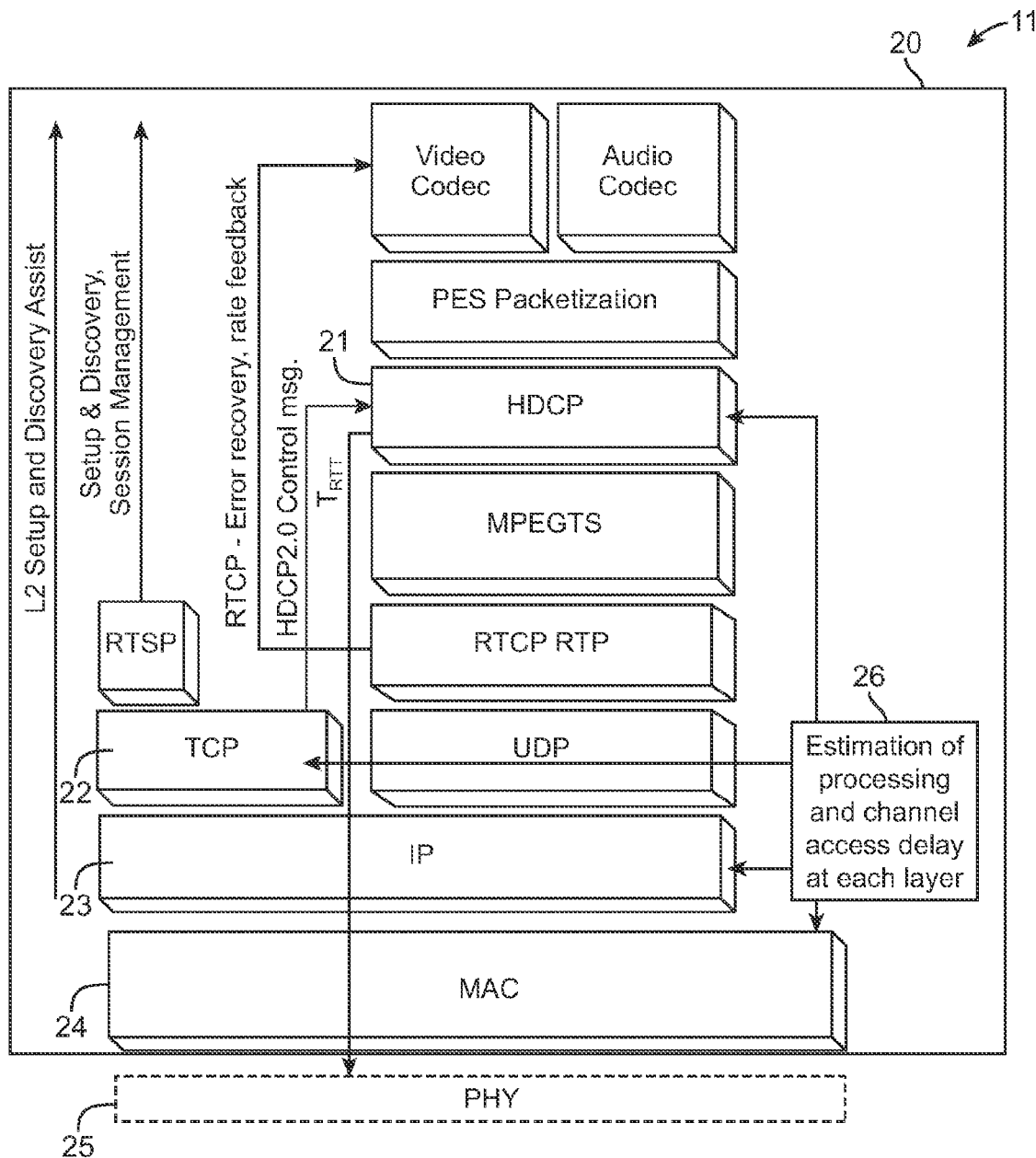
FIG. 2 shows a block diagram of a communication module for a wireless station implementing a Transmission Control Protocol/Internet Protocol (TCP/IP) stack using a locality check module implementing locality check with adaptive timeline, according to an embodiment of the invention.

FIG. 2 shows an example implementation of the transmitter 11 comprising a communication module 20 including a Transmission Control Protocol/Internet Protocol (TCP/IP) stack modified in one respect using a locality check module 26 according to an embodiment of the present invention. HDCP locality check time-line data $T_{RTT}$ traverses from a HDCP processing layer 21 to a Transmission Control Protocol (TCP) processing layer 22 to an Internet Protocol (IP) processing layer 23 and then to a MAC processing layer 24. Finally, the HDCP locality check data $T_{RTT}$ is wirelessly transmitted over an IEEE 802.11 wireless channel via a PHY layer 25.

According to an embodiment of the invention, the locality check module 26 of the wireless transmitter 11 provides dynamic allowance for processing delays and the channel access delays to $T_{RTT}$. Each processing layer in the stack (FIG. 2) keeps track of a processing delay $D_P$ and random channel access delay $D_C$ such that as a locality check packet (locality check frame) including $T_{RTT}$ traverses from the HDCP processing layer 21 to the MAC processing layer 24, $D_P$ and $D_C$ counts (i.e., time measurements) are dynamically incremented based on the amount of processing and channel access delays, respectively, incurred at each processing layer. An overall measured delay D is dynamically determined based on the accumulated (collective) delays over all involved processing layers, wherein $D=D_P+D_C$. In one example $T_{RTT}$ is a specified time period (e.g., 7 ms, etc.).

The processing delay (e.g., queuing delay, hardware processor delay, etc.) at each processing layer is measured (e.g., using time stamping or timer) from the instant the locality check packet including $T_{RTT}$ is received from a higher processing layer and passed on to a lower processing layer in the stack. The count $D_C$ is an additional delay measured from the instant the locality check packet is scheduled for transmission by the MAC processing layer 24 and the instant the very first bit of the locality check packet is transmitted on the wireless channel. For all other processing layers except the MAC processing layer 24, the count $D_C$ is not incremented. At each instant, the MAC processing layer 24 dynamically maintains the cumulative $D_P$ and $D_C$, wherein sum D of both delays is used to provide allowance to the $T_{RTT}$, according to an embodiment of the invention.

Figure 3:
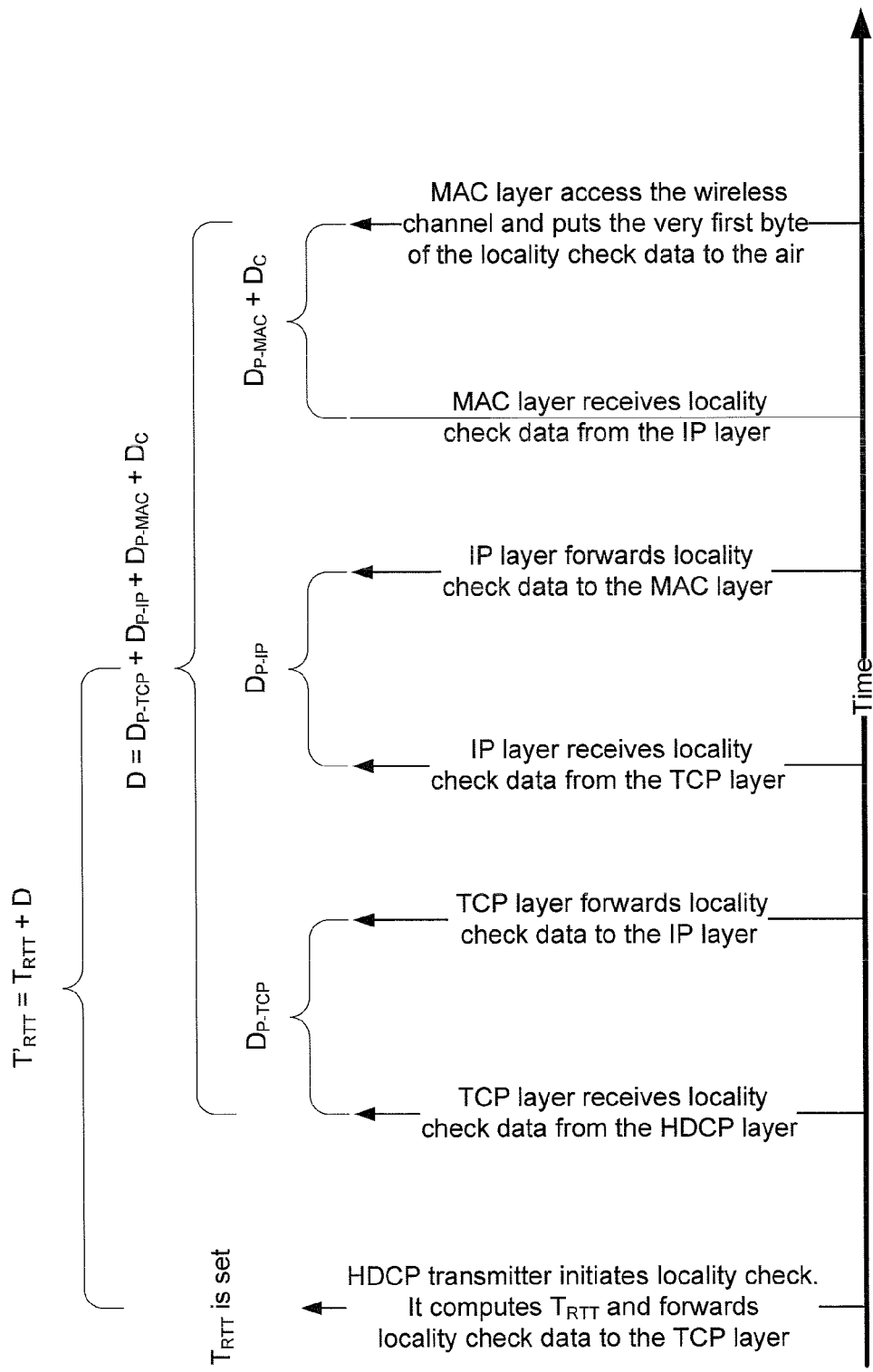
FIG. 3 shows a timeline of an example modified locality check process with adaptive timeline, according to an embodiment of the invention.

FIG. 3 illustrates a timeline of an example modified locality check process 40 according to the invention, illustrating locality check packet flow from the HDCP process layer 21 (FIG. 2) to the MAC layer 24, and how the $D_P$ and $D_C$ are measured at each process layer and $T_{RTT}$ dynamically accordingly adapted (adjusted) to obtain the adjusted locality check time-line $T'_{RTT}$.

FIG. 3 illustrates processing layer delays and channel access delays as measured at the transmitter 11. The overall measured delay $D=D_P+D_C$ is more specifically represented as $D=D_{P-TCP}+D_{P-IP}+D_{P-MAC}+D_C$ wherein $D_{P-TCP}$ is the delay at the TCP layer, $D_{P-IP}$ is the delay at the IP layer for processing, $D_{P-MAC}$ is the delay at the MAC layer for processing, $D_C$ is said random channel access delay ($D_C$), such that $T'_{RTT}=T_{RTT}+D$.

According to an embodiment of the invention, upon receiving a locality check response message from the wireless receiver, the transmitter 11 determines a time period elapsed since transmission of the locality check message. For example, once the transmitter 11 dynamically adjusts $T_{RTT}$ by the measured D to obtain the adjusted locality check time-line $T'_{RTT}=T_{RTT}+D$, the transmitter 11 still accepts a locality check response from the receiver 12 which may arrive during a time period D after the end of the original $T_{RTT}$.

Figure 4:
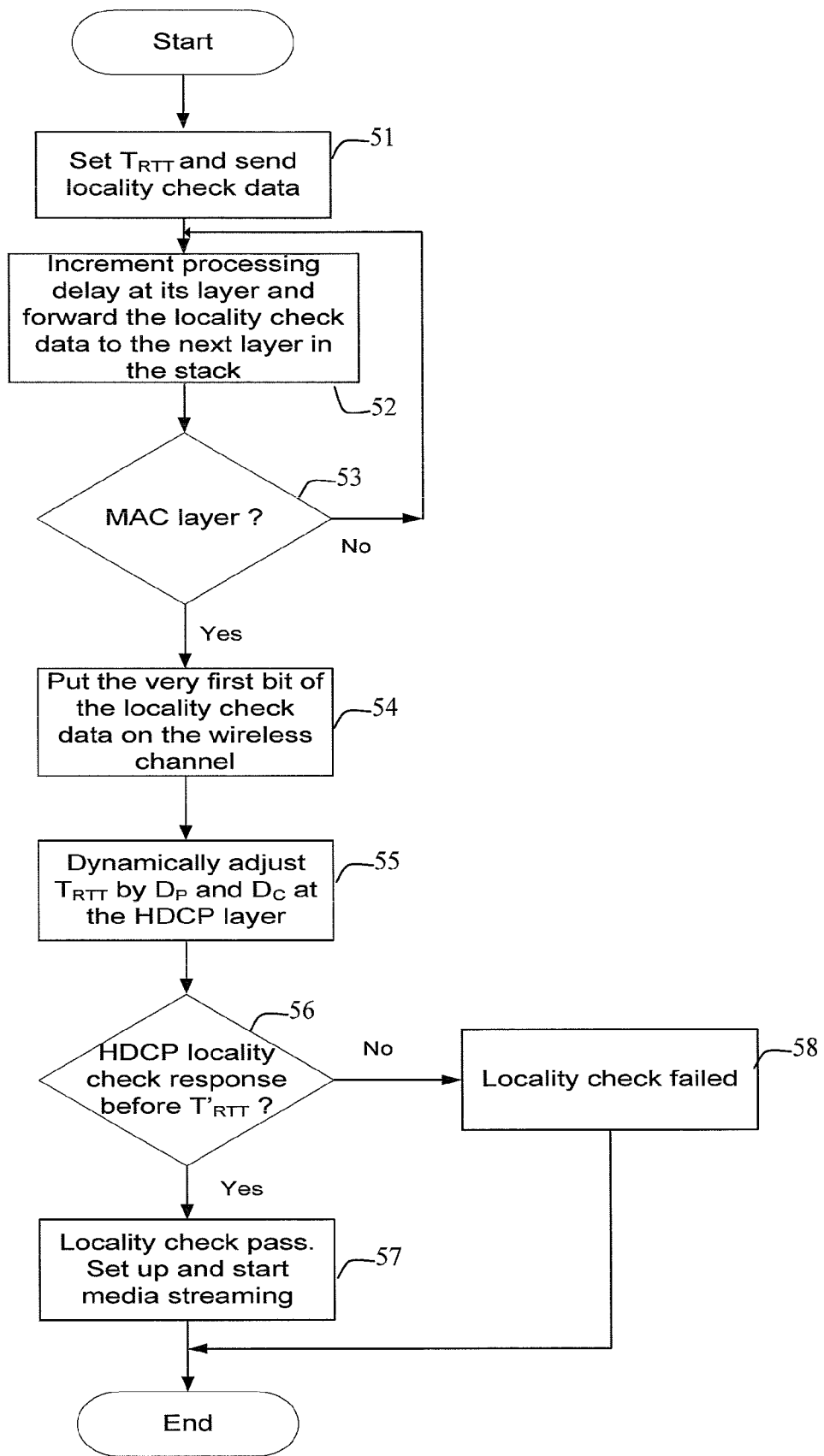
FIG. 4 shows a flowchart of a modified locality check process with adaptive timeline, according to an embodiment of the invention.

FIG. 4 shows a flowchart of a modified locality check process 50 at a wireless transmitter 11 in a WLAN, according to an embodiment of the invention. The process 50 includes the following process blocks:

Block 51: Set locality check data $T_{RTT}$ to a selected value and send out from the HDCP process layer to the next process layer in the TCP/IP stack.

Block 52: Increment processing delay $D_P$ at the current processing layer and forward the locality check data to the next process layer in the stack.

Block 53: Current process layer is MAC layer? If yes, proceed to block 54, else proceed to block 52.

Block 54: Transmit the very first bit of the HDCP locality check data $T_{RTT}$ on the wireless channel.

Block 55: Dynamically adjust $T_{RTT}$ by adding $D_P$ and $D_C$ to obtain $T'_{RTT}$, at the HDCP process layer.

Block 56: Determine if a response to the transmitted HDCP locality check data arrived from receiver before $T'_{RTT}$? If not, proceed to block 58, else proceed to block 57.

Block 57: Locality check pass. Set up and start media streaming. End.

Block 58: Locality check failed. Do not initiate set up and media processing. End.

The process 50 in FIG. 4 provides control of random processing delay in the TCP/IP stack, and its effect on $T_{RTT}$. The process 50 also increases the chance of success of locality check, which may otherwise fail. In one example, the invention reduces delay in setting up a digital A/V streaming session between a wireless video transmitter (e.g., a wireless A/V content source) and a wireless video receiver (e.g., a wireless A/V content player or display device), thus improving user experience.

In another implementation, the transmitter 11 may stop measuring the channel access delay ($D_C$) and processing delays ($D_P$) once a MAC layer Acknowledgement (Ack) is received from the receiver. In yet another implementation, the MAC layer 24 at the transmitter 11 passes on the accumulated $D_P$ and $D_C$ to the HDCP process layer 21 and allows the HDCP process layer 21 to dynamically adjust the $T_{RTT}$ such that the locality check response arriving after the expiry of $T_{RTT}$ but before $T_{RTT}+D_P+D_c$, is treated as a valid response. Other variations are possible as will be recognized by those skilled in the art.

Example Application of the Modified Locality Check Process

Because the modified locality check process according to an embodiment of the invention involves $T_{RTT}$ as shown in FIG. 1, adaptive processing may be performed at each processing layer to reduce $T_{RTT}$. As the locality check packet traverses through the TCP, IP and MAC layers in FIG. 2, adaptive processing is provided at one or more of said process layers. An adaptive processing at the TCP process layer is described below, followed by adaptive processing at the IP layer and the MAC layer.

TCP Layer Adaptive Processing

Figure 5:
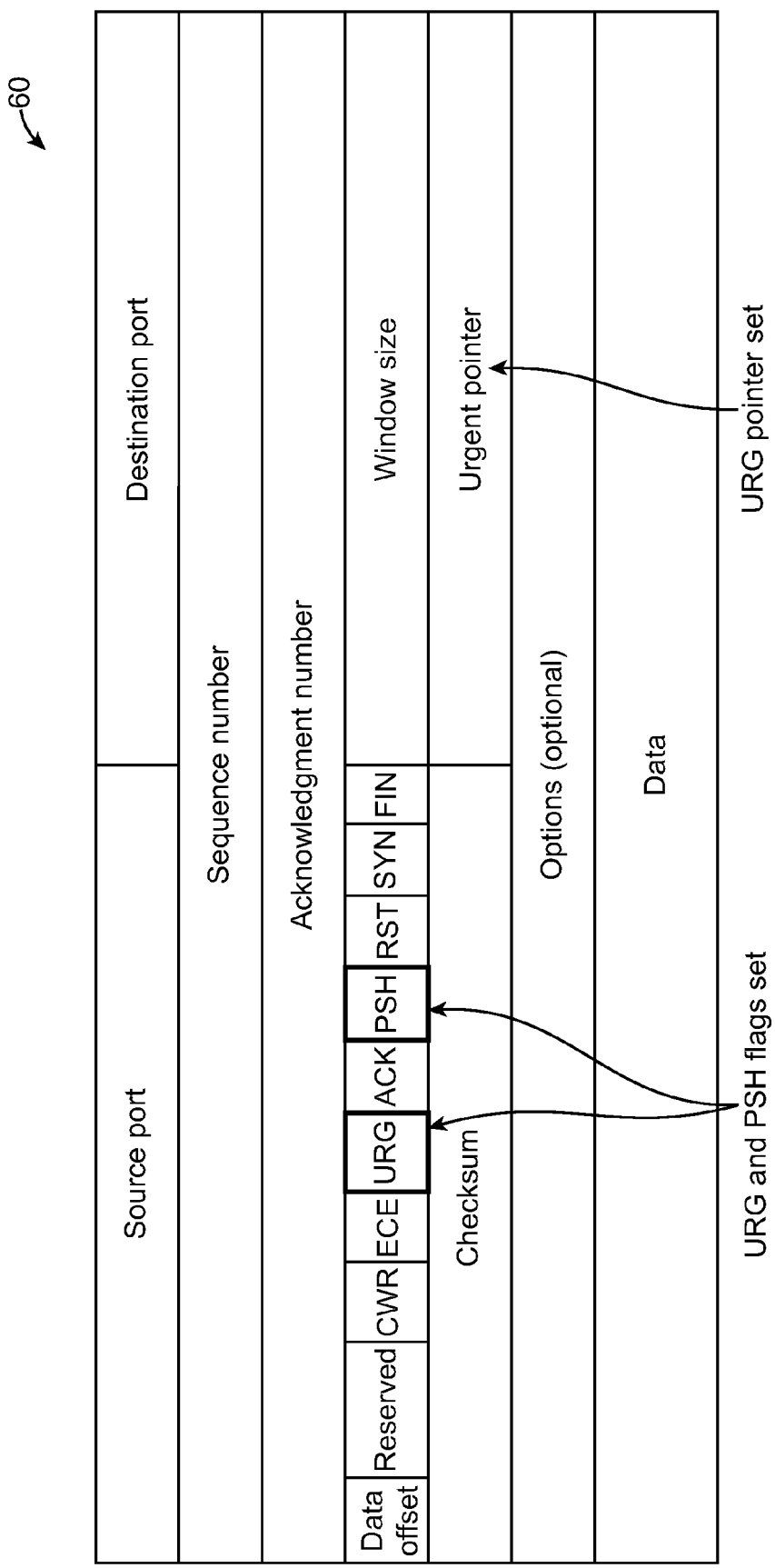
FIG. 5 shows a TCP packet for transmitting a locality check packet in a modified locality check process with adaptive timeline, according to an embodiment of the invention.

According to an embodiment of the invention, as shown in FIG. 5, at the transmitter 11 the Urgent (URG) and Push (PSH) flags in a TCP packet 60 may be used in TCP socket options to provide adaptive processing of the locality check packet. The PSH flag is a notification from the transmitter 11 to the receiver 12 comprising a conventional (un-modified) TCP/IP stack, for the receiver 12 to pass all the data that it has to a receiving process (e.g., receiver HDCP process layer). This data comprises segment data (i.e., standard TCP packet) with the PSH flag, along with any other data the receiver TCP layer has collected for the receiving process.

The receiver 12 preferably passes the received locality check data to an unmodified HDCP receiver process layer therein, as soon as possible. In addition, by setting said PSH flag, a modified HDCP transmitter 11 according to the invention, indicates that it does not require the locality check data to remain in the transmitter TCP buffer awaiting additional data, therefore, allowing transmission of the received TCP segment carrying the HDCP locality urgently to the receiver 12. Furthermore, this urgently provides a received TCP segment to the HDCP process layer at the receiver 12. By setting the URG flag and URG pointer field as shown in FIG. 5, the modified HDCP transmitter 11 indicates to the HDCP process layer at the receiver that an urgent mode has begun. The URG bit in the TCP header is set and the pointer points to the last byte of urgent data comprising the HDCP locality check data. Upon receipt of the TCP segment with the URG flag set to 1, the TCP receiver 12 examines the URG pointer field and from its value determines which data in the TCP segment is urgent. The TCP receiver 12 then forwards the urgent data to the HDCP process layer at the receiver 12 with an indication that the data is marked as urgent by the transmitter 11.

IP Layer Adaptive Processing

Figure 6:
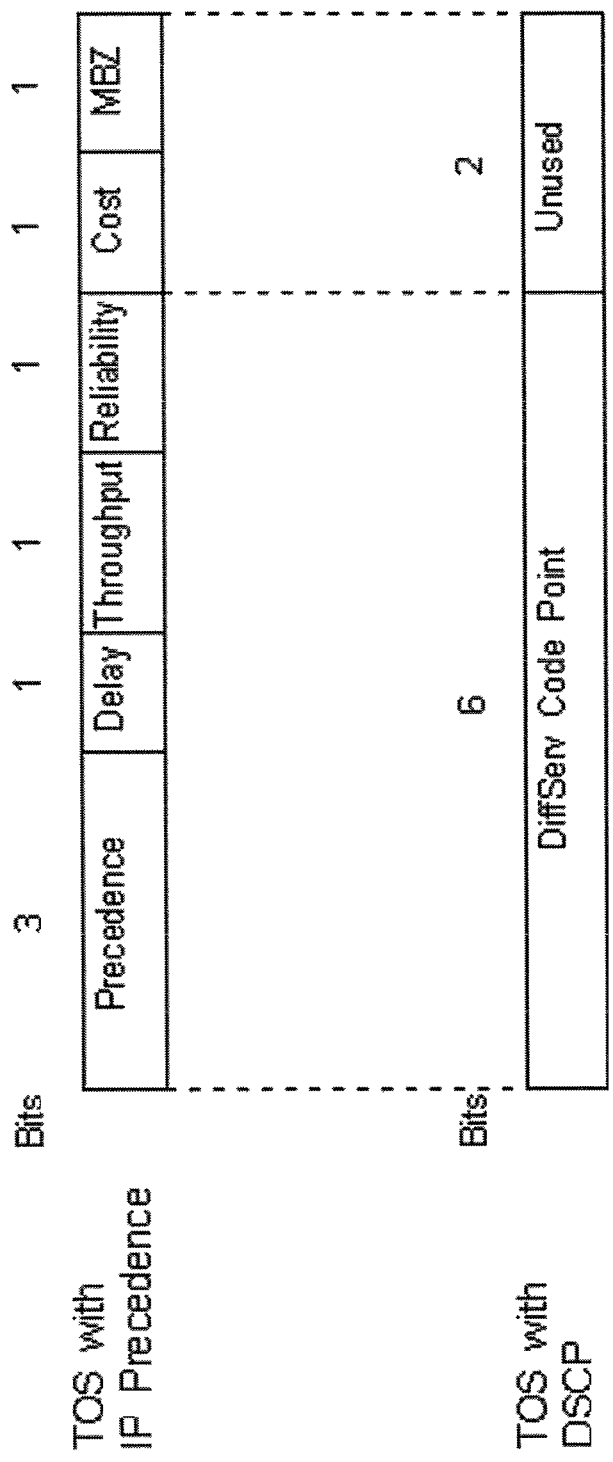
FIG. 6 shows a TCP packet segment for transmitting a locality check packet in a modified locality check process with adaptive timeline, according to an embodiment of the invention.

To provide adaptive processing of the locality check packet at the IP layer at the transmitter 11 according to an embodiment of the invention, the first six bits of the Type of Service (TOS) byte field of the IP header 65 shown in FIG. 6 are set to "101111", corresponding to Expedited forwarding, low delay and low drop probability. As such, the locality check data is treated as a critical frame so that low delay is incurred while processing at the IP layer of transmitter 11. Furthermore, if there is a need to drop an IP datagram, the locality check frame is provided with the low drop probability.

MAC Layer Adaptive Processing

The IEEE 802.11 MAC layer provides different access categories (ACs) for enhanced distributed channel access (EDCA) according to IEEE 802.11 standards. In one embodiment of the invention, in order to provide adaptive processing at the MAC layer 24 as a function of the $T_{RTT}$, the MAC layer 24 (FIG. 2) implements frame differentiation by assigning the locality check packet to the highest priority AC (i.e., AC-VO or voice access category) to reduce channel access delay. In yet another implementation, the highest AC (i.e., AC-VO) provides intra-AC prioritization, wherein the locality check data is provided with the highest AC. In another embodiment, the MAC layer 24 can utilize an optimum Modulation and Coding sequence such that the transmission probability of the frame/packet carrying locality check is increased. With frame differentiation at the MAC layer 24, the locality check frame is assigned the low drop probability at the MAC layer.

Figure 7:
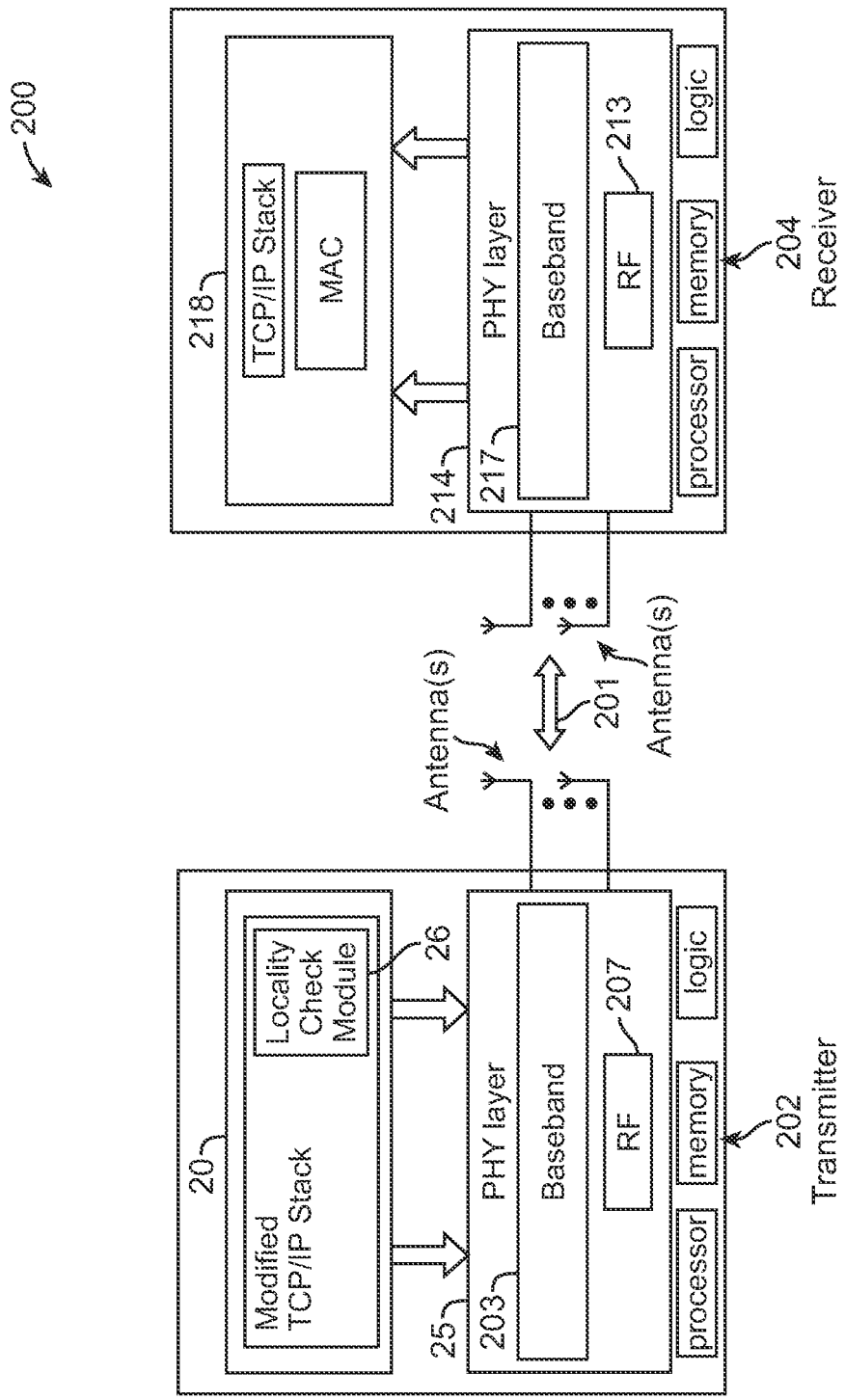
FIG. 7 shows a block diagram of a wireless network implementing digital A/V content protection locality check with adaptive timeline, according to an embodiment of the invention.

FIG. 7 shows a block diagram of an example wireless communication system 200, implementing a modified locality check process according to an embodiment of the present invention. The system 200 comprises a WLAN implementing digital content protection locality check with adaptive timeline for information communication such as data, audio/video information, etc.

The system 200 includes wireless transceiver stations/devices such as a wireless HDCP transmitter (sender) station 202 (such as transmitter 11 in FIG. 1) and a wireless HDCP receiver station 204 (such as receiver 12 in FIG. 1), configured for communication over a wireless communication medium such as an RF wireless channel 201 in a wireless network (such as a WLAN), according to an embodiment the invention.

The transmitter 202 includes a PHY layer 25 and a communication module 20, including said locality check module 26 (FIG. 2), according to an embodiment of the invention. The communication module 20 comprises an architecture such as shown in FIG. 2 implementing a modified locality check process according to an embodiment of the invention, and may further include an application layer including an audio/visual (A/V) pre-processing module (not shown) for packetizing video streams, which are then converted to MAC packets by the MAC layer in the communication module 20. The application layer may further include an AV/C control module which sends stream transmission requests and control commands to access the wireless channel for transmission of packets.

The PHY layer 25 includes a radio frequency (RF) communication module 207 which transmits/receives signals under control of a baseband process module 203. The baseband module 203 allows communicating control information and video information.

The receiver 204 includes a PHY layer 214 and a conventional TCP/IP stack 218. The TCP/IP stack 218 may further include an application layer including an A/V post-processing module (not shown) for de-packetizing into streams the video information in the MAC packets, received by TCP/IP stack 218. The de-packetizing is reverse of the packetization. The receiver application layer may further include an AV/C control module which handles stream control and channel access. The PHY layer 214 includes an RF communication module 213 which transmits/receives signals under control of a baseband process module 217. Beamforming transmissions may be performed over multiple channels. The MAC/PHY layers may perform antenna training and beaming switching control.

The present invention is useful with other systems, wherein a device enforces locality on content by requiring that the round trip time between a pair of messages to be no more than a specified time period (e.g., 7 ms, etc.). This allows prevention of distribution of content beyond a wired and/or wireless local area network such as a home network.

As is known to those skilled in the art, the aforementioned example architectures described above, according to the present invention, can be implemented in many ways, such as program instructions for execution by a hardware processor, as software modules, microcode, as computer program product on computer readable media, as analog/digital/logic circuits, as application specific integrated circuits, as firmware, as consumer electronic devices, etc. Further, embodiments of the invention can take the form of an entirely hardware embodiment, an entirely software embodiment or an embodiment containing both hardware and software elements.

What is claimed is:

1. A method of data communication in a wireless network, comprising:
   transmitting a locality check message from a wireless transmitter to a wireless receiver over a wireless communication medium, wherein said transmitting comprises transmitting a first packet for adaptive processing of a locality check packet, to notify the wireless receiver to pass received first packet segment data and receiver collected data to a digital copy protection process layer of the wireless receiver, the wireless transmitter comprising a physical layer for wireless communication over the wireless communication medium;
   upon receiving a locality check response message from the wireless receiver at the wireless transmitter, marking the locality check response message as valid even if it arrives after an original locality check time period since transmission of the locality check message, but before the end of an adjusted locality check time period;
   wherein the adjusted locality check time period comprises said original locality check time period adjusted by delays in processing layers at the wireless transmitter and wireless communication medium access delays in data communication at the wireless transmitter.

2. The method of claim 1, further comprising:
   upon receiving a locality check response message from the wireless receiver, determining elapsed time since transmission of the locality check message and marking the locality check response message as valid if said elapsed time is less than the adjusted locality check time period.

3. The method of claim 1, further comprising:
   dynamically determining an adjustment to said original locality check time period by measuring delay in each processing layer at the wireless transmitter involved in processing said locality check message for transmission to the wireless receiver;
   accumulating the measured delay in each processing layer; and
   determining the adjusted locality check time period by dynamically adjusting the original locality check period with said accumulated measured delay.

4. The method of claim 3, further comprising:
   determining wireless communication medium access delay in transmitting the locality check message from the wireless transmitter and the wireless receiver;
   wherein determining the adjusted locality check time period further comprises dynamically adjusting the original locality check period with said accumulated measured delay and said wireless communication medium access delay.

5. The method of claim 4, wherein:
   the wireless network comprises a wireless local area network and the wireless communication medium comprises a wireless channel; and
   measuring delay in each processing layer at the wireless transmitter further comprises measuring processing delay at one or more Transmission Control Protocol/Internet Protocol (TCP/IP) stack processing layers at the wireless transmitter involved in processing said locality check message for transmission to the wireless receiver.

6. The method of claim 5, wherein:
   determining wireless communication medium access delay further comprises measuring Media Access Control (MAC) layer wireless channel access delay for transmitting the locality check message to the wireless receiver.

7. The method of claim 6, wherein:
   measuring delay in each processing layer at one or more TCP/IP stack processing layers further comprises:
      measuring a delay $D_{P\text{-}TCP}$ at an TCP process layer of the TCP/IP stack;
      measuring a delay $D_{P\text{-}IP}$ at the IP layer of the TCP/IP stack; and
      determining wireless communication medium access delay further comprises measuring a delay $D_{P\text{-}MAC}$ at the MAC layer.

8. The method of claim 7, wherein:
   determining wireless communication medium access delay further comprises determining a random channel access delay $D_C$ measured from the instant the locality check message is scheduled for transmission by the MAC processing layer and the instant the very first bit of the locality check message is transmitted on the wireless channel.

9. The method of claim 8, wherein:
   the wireless transmitter comprises a High-bandwidth Digital Content Protection (HDCP) wireless transmitter and the wireless receiver comprises a HDCP wireless receiver.

10. The method of claim 9, further comprising:
    upon marking the locality check response message as valid performing media streaming between the wireless transmitter and the wireless receiver, wherein the media comprises digital audio/video content.

11. The method of claim 9, further comprising:
    upon receiving the locality check response message from the wireless receiver, marking the locality check response message as invalid if it arrives after the end of an adjusted locality check time period.

12. The method of claim 11, wherein the first packet comprises a TCP packet utilizing Urgent (URG) and Push (PSH) flags therein for the adaptive processing of the locality check packet, the process layer comprises an HDCP process layer, and the wireless receiver is notified to pass received TCP packet segment data with the PSH flag to the HDCP process layer of the wireless receiver as soon as possible, along with any other data the receiver has collected for the HDCP process layer of the wireless receiver.

13. The method of claim 12, further comprising:
    the wireless transmitter setting the URG flag and an URG pointer field in the TCP packet to the locality check data, indicating an urgent mode to the HDCP process layer at the wireless receiver, wherein the HDCP process layer at the wireless receiver examines the URG pointer field to determine which data in the TCP segment is urgent to forward to the HDCP process layer at the receiver with an indication that the data is marked as urgent by the wireless transmitter.

14. The method of claim 13, further comprising:
    performing adaptive processing of the locality check packet at an IP layer at the wireless transmitter, wherein the first six bits of the Type of Service (TOS) byte field of an IP header are set to "101111", corresponding to Expedited forwarding, low delay and low drop probability, such that the locality check data is treated as a critical frame such that low delay is incurred while processing at the IP layer of wireless transmitter.

15. The method of claim 14, further comprising:
performing adaptive processing at a MAC layer of the wireless transmitter as a function of the original locality check time period ($T_{RTT}$) utilizing frame differentiation by assigning a locality check packet to the highest priority access category (AC) for enhanced distributed channel access (EDCA), to reduce channel access delay.

16. The method of claim 15, wherein:
the highest AC provides intra-AC prioritization, wherein the locality check data is provided with the highest AC.

17. The method of claim 1, further comprising:
a Media Access Control (MAC) layer of the wireless transmitter utilizing an optimum Modulation and Coding sequence to increase transmission probability of a packet carrying locality check.

18. The method of claim 1, further comprising:
using an optimum Modulation and Coding sequence, by the wireless transmitter, for increasing transmission probability of a packet carrying locality check.

19. The method of claim 1, wherein the digital copy protection process layer comprises a High-bandwidth Digital Content Protection (HDCP) process layer.

20. A wireless station for data communication in a wireless network, comprising:
a physical layer for wireless communication over a wireless communication medium;
a transmitter configured for:
transmitting a locality check message to a wireless receiver over a wireless communication medium, wherein said transmitting comprises transmitting a first packet for adaptive processing of a locality check packet, to notify the wireless receiver to pass received first packet segment data and receiver collected data to a digital copy protection process layer of the wireless receiver;
upon receiving a locality check response message from the wireless receiver, marking the locality check response message as valid even if it arrives after an original locality check time period since transmission of the locality check message, but before the end of an adjusted locality check time period; and a locality check module configured for dynamically determining an adjusted locality check time period comprising said original locality check time period adjusted by delays in processing layers and wireless communication medium access delays in data communication between the wireless station and the wireless receiver.

21. The wireless station of claim 20, wherein the communication module is configured for:
upon receiving a locality check response message from the wireless receiver, determining elapsed time since transmission of the locality check message and marking the locality check response message as valid if said elapsed time is less than the adjusted locality check time period.

22. The wireless station of claim 20, wherein the locality check module is further configured for:
dynamically determining an adjustment to said original locality check time period by measuring delay in each processing layer at the wireless station involved in processing said locality check message for transmission to the wireless receiver;
accumulating the measured delay in each processing layer; and
determining the adjusted locality check time period by dynamically adjusting the original locality check period with said accumulated measured delay.

23. The wireless station of claim 22, wherein the locality check module is further configured for:

determining wireless communication medium access delay in transmitting the locality check message from the wireless station and the wireless receiver; and
determining the adjusted locality check time period by dynamically adjusting the original locality check period with said accumulated measured delay and said wireless communication medium access delay.

24. The wireless station of claim 23, wherein:
the wireless network comprises a wireless local area network and the wireless communication medium comprises a wireless channel; and
the locality check module is further configured for measuring delay in each processing layer at the wireless station further comprises measuring processing delay at one or more Transmission Control Protocol/Internet Protocol (TCP/IP) stack processing layers at the wireless station involved in processing said locality check message for transmission to the wireless receiver.

25. The wireless station of claim 24, wherein:
the locality check module is further configured for determining wireless communication medium access delay by measuring Media Access Control (MAC) layer wireless channel access delay for transmitting the locality check message to the wireless receiver.

26. The wireless station of claim 25, wherein:
the locality check module is further configured for measuring delay in each processing layer at one or more TCP/IP stack processing layers by:
measuring a delay $D_{P\text{-}TCP}$ at an TCP process layer of the TCP/IP stack;
measuring a delay $D_{P\text{-}IP}$ at the IP layer of the TCP/IP stack; and
determining wireless communication medium access delay further comprises measuring a delay $D_{P\text{-}MAC}$ at the MAC layer.

27. The wireless station of claim 26, wherein:
the locality check module is further configured for determining wireless communication medium access delay by determining a random channel access delay $D_C$ measured from the instant the locality check message is scheduled for transmission by the MAC processing layer and the instant the very first bit of the locality check message is transmitted on the wireless channel.

28. The wireless station of claim 27, wherein:
the wireless station comprises a High-bandwidth Digital Content Protection (HDCP) wireless transmitter and the wireless receiver comprises a HDCP wireless receiver.

29. The wireless station of claim 28, wherein the first packet comprises a TCP packet utilizing Urgent (URG) and Push (PSH) flags therein for the adaptive processing of the locality check packet, the process layer comprises an HDCP process layer, and the wireless receiver is notified to pass received TCP packet segment data with the PSH flag to the HDCP process layer of the wireless receiver as soon as possible, along with any other data the wireless receiver has collected for the HDCP process layer of the wireless receiver.

30. The wireless station of claim 29, wherein:
the communication module is further configures for setting an URG flag and an URG pointer field in the TCP packet to the locality check data, indicating an urgent mode to the HDCP process layer at the wireless receiver, wherein the HDCP process layer at the wireless receiver examines the URG pointer field to determine which data in the TCP segment is urgent to forward to the HDCP process layer at the wireless receiver with an indication that the data is marked as urgent by the wireless station.

31. The wireless station of claim 30, wherein:
the locality check module is further configured for performing adaptive processing of the locality check packet at an IP layer at the wireless station wherein the first six bits of the Type of Service (TOS) byte field of an IP header are set to "101111", corresponding to Expedited forwarding, low delay and low drop probability, such that the locality check data is treated as a critical frame such that low delay is incurred while processing at the IP layer of the wireless station.

32. The wireless station of claim 31, wherein:
the locality check module is further configured for performing adaptive processing at a MAC layer of the wireless station as a function of the original locality check time period ($T_{RTT}$) utilizing frame differentiation by assigning a locality check packet to the highest priority access category (AC) for enhanced distributed channel access (EDCA), to reduce channel access delay.

33. The wireless station of claim 32, wherein:
the highest AC provides intra-AC prioritization, wherein the locality check data is provided with the highest AC.

34. The wireless station of claim 20, wherein:
a Media Access Control (MAC) layer of the wireless station is configured for utilizing an optimum Modulation and Coding sequence to increase transmission probability of a packet carrying locality check information.

35. The wireless station of claim 20, wherein the first packet comprises a Transmission Control Protocol (TCP) packet utilizing Urgent (URG) and Push (PSH) flags therein for the adaptive processing of the locality check packet.

36. The wireless station of claim 20, wherein the digital copy protection process layer comprises a High-bandwidth Digital Content Protection (HDCP) process layer.

37. A wireless network, comprising:
a wireless transmitter and a wireless receiver configured for communicating information over a wireless communication medium;
wherein the wireless transmitter comprises:
a communication module configured for:
transmitting a locality check message from a wireless transmitter to a wireless receiver over a wireless communication medium, wherein said transmitting comprises transmitting a first packet for adaptive processing of a locality check packet, to notify the wireless receiver to pass received first packet segment data and receiver collected data to a digital copy protection process layer of the wireless receiver;
upon receiving a locality check response message from the wireless receiver, marking the locality check response message as valid even if it arrives after an original locality check time period since transmission of the locality check message, but before the end of an adjusted locality check time period; and
a locality check module configured for dynamically determining an adjusted locality check time period comprising said original locality check time period adjusted by delays in processing layers and wireless communication medium access delays in data communication between the wireless transmitter and the wireless receiver.

38. The wireless network of claim 37, wherein the transmitter communication module is configured for:
upon receiving a locality check response message from the wireless receiver, determining elapsed time since transmission of the locality check message and marking the locality check response message as valid if said elapsed time is less than the adjusted locality check time period.

39. The wireless network of claim 37, wherein the transmitter locality check module is further configured for:
dynamically determining an adjustment to said original locality check time period by measuring delay in each processing layer at the wireless transmitter involved in processing said locality check message for transmission to the wireless receiver;
accumulating the measured delay in each processing layer;
determining the adjusted locality check time period by dynamically adjusting the original locality check period with said accumulated measured delay;
determining wireless communication medium access delay in transmitting the locality check message from the wireless transmitter to the wireless receiver; and
determining the adjusted locality check time period by dynamically adjusting the original locality check period with said accumulated measured delay and said wireless communication medium access delay.

40. The wireless network of claim 39, wherein:
the wireless network comprises a wireless local area network and the communication medium comprises a wireless channel; and
the transmitter locality check module is further configured for:
measuring delay in each processing layer at the wireless transmitter further comprises measuring processing delay at one or more Transmission Control Protocol/Internet Protocol (TCP/IP) stack processing layers at the wireless transmitter involved in processing said locality check message for transmission to the wireless receiver; and
determining wireless communication medium access delay by measuring Media Access Control (MAC) layer wireless channel access delay for transmitting the locality check message to the wireless receiver.

41. The wireless network of claim 40, wherein:
the locality check module is further configured for measuring delay in each processing layer at one or more TCP/IP stack processing layers by:
measuring a delay $D_{P\text{-}TCP}$ at an TCP process layer of the TCP/IP stack;
measuring a delay $D_{P\text{-}IP}$ at the IP layer of the TCP/IP stack; and
determining wireless communication medium access delay further comprises measuring a delay $D_{P\text{-}MAC}$ at the MAC layer;
the locality check module is further configured for determining wireless communication medium access delay by determining a random channel access delay $D_C$ measured from the instant the locality check message is scheduled for transmission by the MAC processing layer and the instant the very first bit of the locality check message is transmitted on the wireless channel; and
the wireless transmitter comprises a High-bandwidth Digital Content Protection (HDCP) wireless transmitter and the wireless receiver comprises a HDCP wireless receiver.

42. The wireless network of claim 37, wherein the first packet comprises a TCP packet utilizing Urgent (URG) and Push (PSH) flags therein for the adaptive processing of the locality check packet, the process layer comprises an HDCP process layer, and the wireless receiver is notified to pass received TCP packet segment data with the PSH flag to the HDCP process layer of the wireless receiver as soon as possible, along with any other data the receiver has collected for the HDCP process layer of the wireless receiver.

43. A method of data communication in a wireless network, comprising:
- transmitting a locality check message from a wireless transmitter to a wireless receiver over a wireless communication medium to notify the wireless receiver to pass received segment data to a digital copy protection process layer of the wireless receiver, the wireless transmitter comprising a physical layer for wireless communication over the wireless communication medium;
- upon receiving a locality check response message from the wireless receiver at the wireless transmitter, marking the locality check response message as valid even if it arrives after an original locality check time period since transmission of the locality check message, but before the end of an adjusted locality check time period; and
- performing adaptive processing at a MAC layer of the wireless transmitter as a function of the original locality check time period ($T_{RTT}$) utilizing frame differentiation.

44. The method of claim 43, wherein the adjusted locality check time period comprises said original locality check time period adjusted by delays in processing layers at the wireless transmitter and wireless communication medium access delays in data communication at the wireless transmitter.

45. The method of claim 43, wherein the MAC layer uses an optimum Modulation and Coding sequence to increase transmission probability of a packet carrying locality check information.

46. The method of claim 43, wherein the digital copy protection process layer comprises a High-bandwidth Digital Content Protection (HDCP) process layer.

* * * * *